Aug. 10, 1965 H. A. MARSH, JR 3,199,477
INTERLOCKING BRICK
Filed Sept. 18, 1963 3 Sheets-Sheet 1
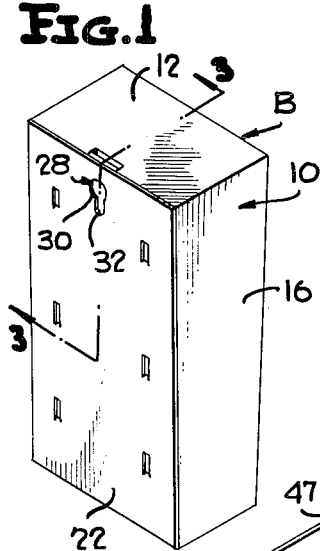
FIG.1
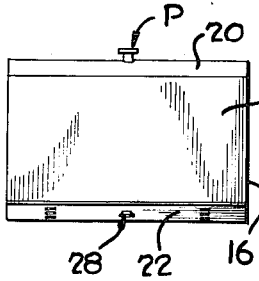
FIG.2
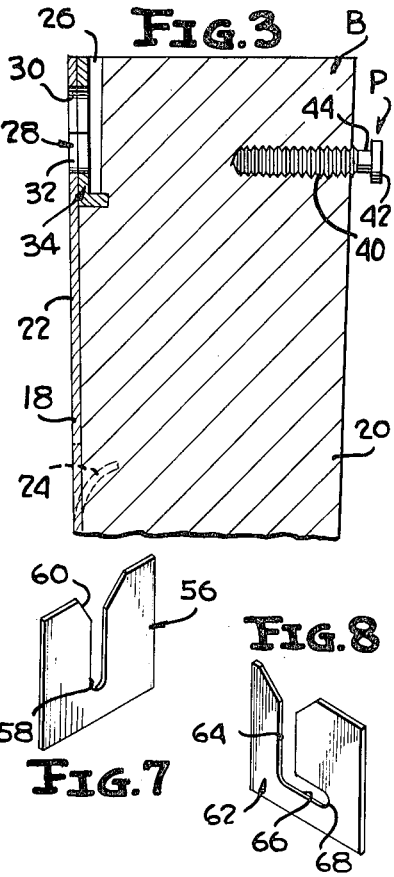
FIG.3
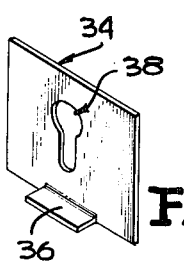
FIG.4
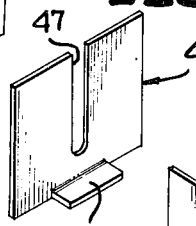
FIG.5
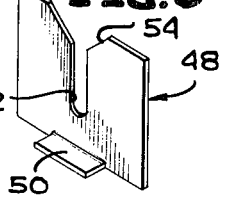
FIG.6
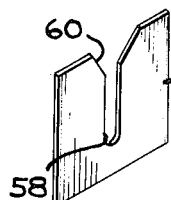
FIG.7
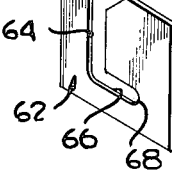
FIG.8
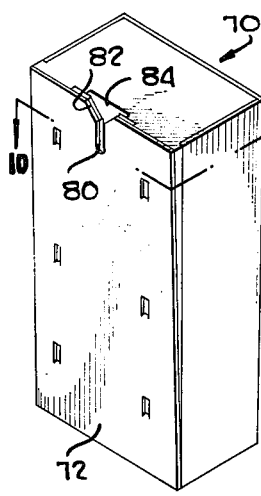
FIG.9
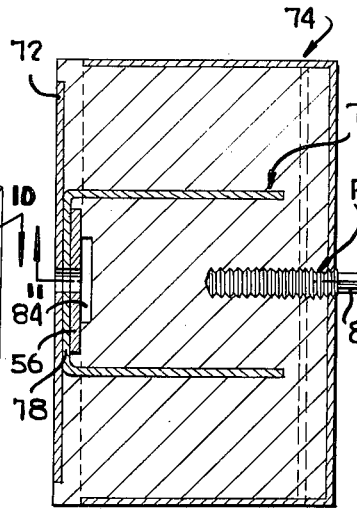
FIG.10
FIG.11
INVENTOR
HARRY A. MARSH, JR.
BY *Shoemaker and Mattare*
ATTORNEYS

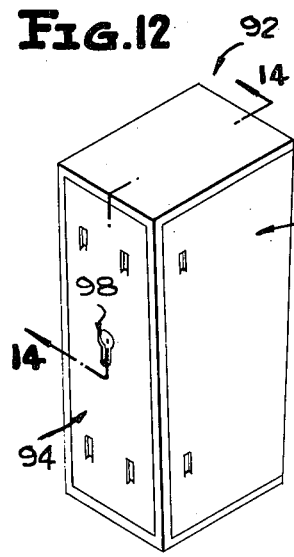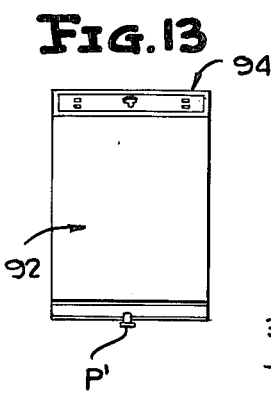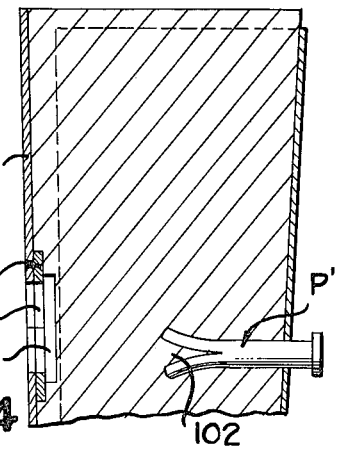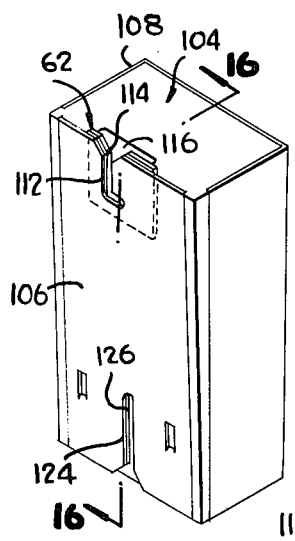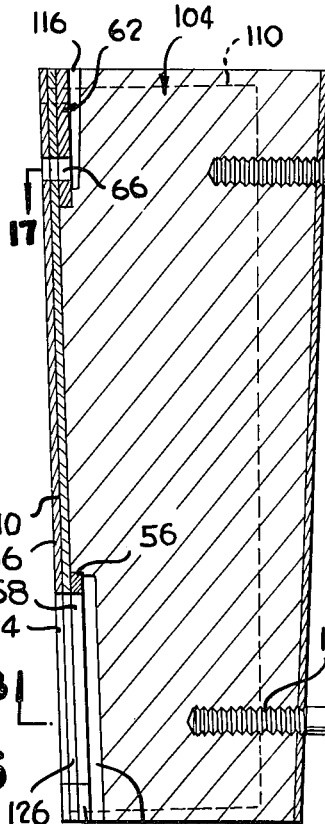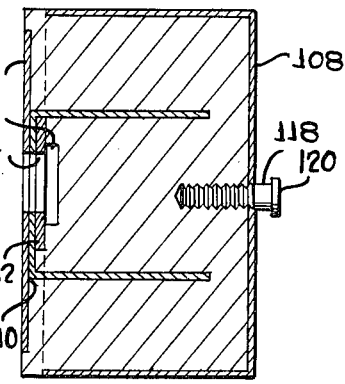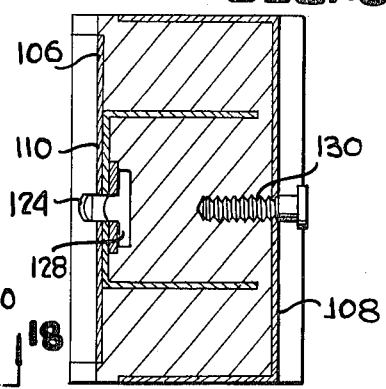

Aug. 10, 1965    H. A. MARSH, JR    3,199,477
INTERLOCKING BRICK
Filed Sept. 18, 1963    3 Sheets-Sheet 3
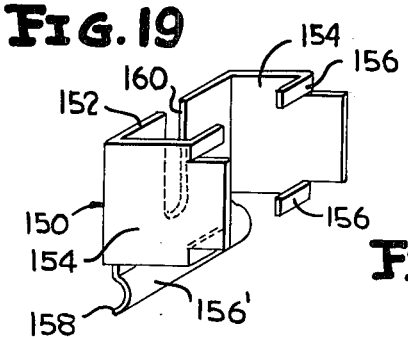
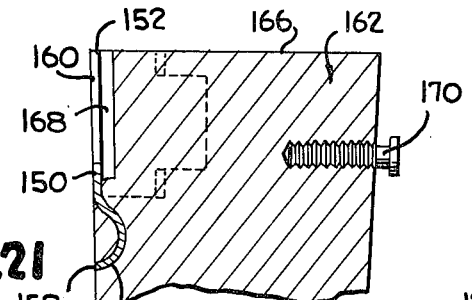
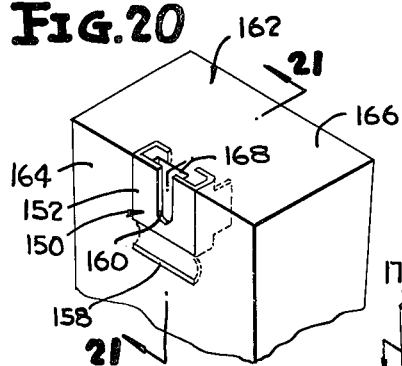
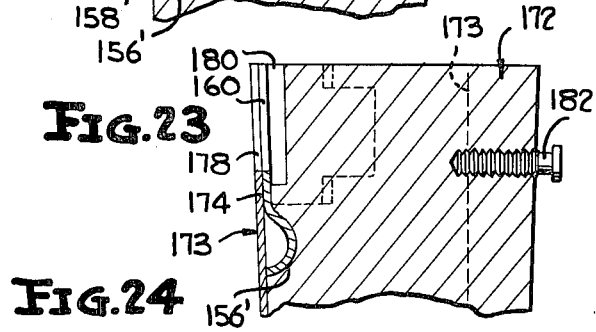
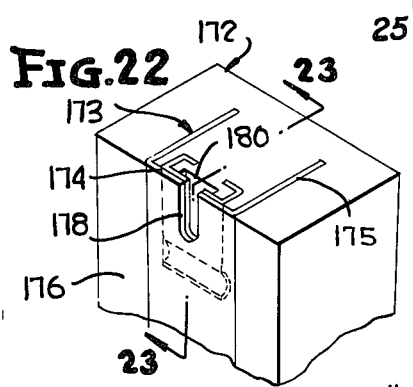
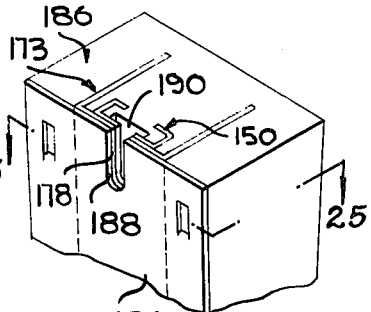
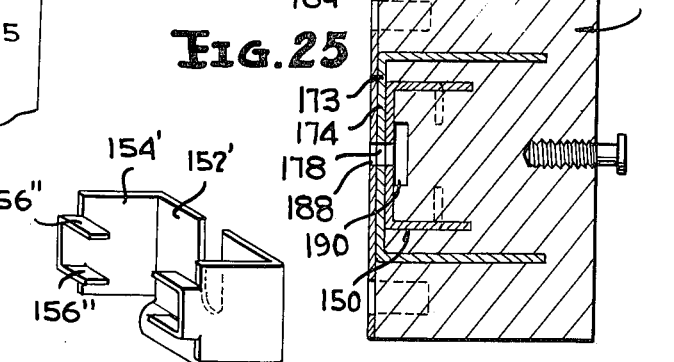
INVENTOR
HARRY A. MARSH, JR.
BY *Shoemaker and Mattare*
ATTORNEYS

United States Patent Office 3,199,477
Patented Aug. 10, 1965

3,199,477
INTERLOCKING BRICK
Harry A. Marsh, Jr., Rosemont, Pa., assignor to E. J. Lavino and Company, Philadelphia, Pa., a corporation of Delaware
Filed Sept. 18, 1963, Ser. No. 309,750
18 Claims. (Cl. 110—99)

This invention relates generally to improvements in bricks, and more particularly, to refractory bricks of the type employed in the construction of steel-making furnaces or other industrial furnaces.

A principal object of the present invention is to provide a novel interlocking brick, so formed or constructed that any number thereof may be physically coupled together to form a structural unit such as a furnace roof or other structure.

Another object of the invention is to provide a novel interlocking brick structure in which a number of such bricks may be assembled and coupled together to form a self-supporting sprung arch roof structure, such as a sprung arch roof, supported by and between skewbacks of an open hearth steel-making furnace.

More specifically, the invention has for its object to provide an interlocking refractory brick structure, which consists of a suspension pin with a head flange projecting from one face of the brick, and a pin-receiving socket formed in the opposite face of the brick, and with such pin and socket so positioned that two or more like bricks may be assembled with corresponding sides of the bricks flush with one another, and with all of the bricks securely locked together to form a continuous self-sustaining unit.

The present invention is applicable to any type of brick, but its application is primarily directed to basic brick consisting of magnesite, magnesite-chrome and chrome.

Broadly, the invention, as applied to the interlocking brick structure per se, comprises a brick of refractory material of any size or shape, either burned or unburned, and it may be encased on four sides with a metal jacket and have a metal reinforcing channel therein of conventional form or it may be made without any external plates or without an internal channel.

The brick also may be clad on one face only without a metal reinforcing channel, and the body of the brick is provided on one side-face with a recess to receive the head of a coupling pin projecting from a side-face of a corresponding brick. The metal sheet or cladding secured to the face of the brick in which the pinhead-receiving recess is formed, carries a pin-fastener on its inner side, which comprises a plate body, having a slot in which to receive the headed end of a coupling pin of another brick, and the cladding plate is correspondingly slotted.

Upon the opposite side of the brick from the slotted pin-fastener, a coupling pin is embedded in the material of the brick with the headed end projecting from the adjacent side of the brick. The headed pin is so located with respect to the slot in the pin-fastener at the opposite side, that when the headed pin is introduced into a slot of a pin-fastener, forming part of another brick, the two bricks will be securely locked together with corresponding sides flush.

The invention will be best understood from a consideration of the following detailed description taken in connection with the accompanying drawings forming a part of the specification, with the understanding, however, that the invention is not confined to a strict conformity with the showing of the drawings, but may be changed or modified so long as such change or modification mark no material departure from the salient features of the invention, as expressed in the appended claims.

In the drawings:

FIGURE 1 is a view in perspective of an interlocking brick constructed in accordance with an embodiment of the present invention and showing the manner of combining with the brick an external or cladding plate, if such is desired, and providing a keyhole slot therein for cooperation with the reinforcing plate, or socket flange.

FIGURE 2 is a bottom plan view of the brick, which is of tapered form.

FIGURE 3 is a partial vertical section, on an enlarged scale, taken substantially on the line 3—3 of FIGURE 1.

FIGURE 4 is a perspective view of one type of pin-fastener reinforcing plate.

FIGURE 5 is a perspective view of another form or type of pin-fastener reinforcing plate.

FIGURE 6 is a perspective view of still another form of pin-fastener reinforcing plate.

FIGURE 7 is a perspective view of still another form of pin-fastener reinforcing plate.

FIGURE 8 is a perspective view of still another form of pin-fastener reinforcing plate.

FIGURE 9 is a view in perspective of a tapered metal-clad brick showing the side cladding plate formed with a pinhead-receiving slot and having secured to the inner side thereof, a pin-fastener reinforcing plate of the form illustrated in FIGURE 6.

FIGURE 10 is a transverse section taken on an enlarged scale substantially on the line 10—10 of FIGURE 9.

FIGURE 11 is a vertical section on the scale of FIGURE 10, taken substantially on the line 11—11 of FIGURE 10.

FIGURE 12 is a view in perspective of another embodiment of the invention, illustrating the pin-receiving slot in the middle portion of the brick and side cladding plate.

FIGURE 13 is a view in bottom plan of the brick of FIGURE 12.

FIGURE 14 is a vertical section, on an enlarged scale, taken substantially on the line 14—14 of FIGURE 12, and illustrating another type of locking pin anchoring means.

FIGURE 15 is a view in perspective of a brick in association with the top part of which is shown the angulated form of pin-fastener reinforcing plate or socket flange which is illustrated in FIGURE 8 and also illustrating at the bottom end of the brick a pin-receiving slot which opens downwardly and which slot is formed in a cladding or reinforcing plate and reinforcing channel, in association with which plate and channel is employed a socket flange of the type illustrated in FIGURE 6 or FIGURE 7, this cladding plate also being shown with a pin slot in the top edge thereof.

FIGURE 16 is a sectional view, on an enlarged scale, taken substantially on the line 16—16 of FIGURE 15.

FIGURE 17 is a horizontal transverse section taken substantially on the line 17—17 of FIGURE 16, and on the same scale as FIGURE 16.

FIGURE 18 is a horizontal section taken substantially on the line 18—18 of FIGURE 16.

FIGURE 19 is a perspective view of another form of reinforcing plate or socket flange which may be used, as illustrated in following figures, without an internal channel or external plate or with one or the other or both.

FIGURE 20 illustrates the use of the reinforcing plate or socket flange of FIGURE 19, alone in a brick body, the upper or top end only of the brick being illustrated.

FIGURE 21 is a sectional view taken in a vertical plane substantially on the line 21—21 of FIGURE 20.

FIGURE 22 shows the use of the reinforcing plate or socket flange of FIGURE 19 in a brick body in association with a reinforcing channel, the top end only of the brick being illustrated.

FIGURE 23 is a sectional view taken substantially on the line 23—23 of FIGURE 22 and in a vertical plane.

FIGURE 24 is a view corresponding to FIGURE 22 but showing the addition of an external or cladding plate.

FIGURE 25 is a sectional view taken in a horizontal plane transversely of the brick on the line 25—25 of FIGURE 24.

FIGURE 26 illustrates another form of the socket flange, shown in FIGURE 19.

Referring now more particularly to the drawings, the bricks herein illustrated and about to be described, are shown as tapered, or of wedge form, or key form, and thus are particularly suited for construction of an arch structure. However, it is to be understood that the invention is equally applicable to a brick in which the width and thickness are uniform from one end to the other, for use in roofs, as well as locations other than roofs, in industrial furnaces.

The pin and socket about to be described, may be placed at any location on the two opposite faces of the brick, so long as their positions correspond in such a way that when two or more of the bricks are coupled together, the top, bottom and lateral faces will be flush.

Referring now particularly to FIGURES 1, 2 and 3, the reference character B generally designates the brick formed with a pin and socket in accordance with the present invention. In these figures the body of the brick is generally designated 10 and the top, bottom and lateral faces are designated 12, 14 and 16 respectively, while the front and rear sides are designated 18 and 20 respectively.

In the brick construction of these figures, the front side is shown with a cladding plate 22 secured there against, and maintained in position in the usual or conventional manner, by struck-out prong portions 24 which are pressed into the brick as the latter is shaped in the mold. However, this plate may be omitted without imparing functioning of the invention.

The front surface of the brick body is formed with a recess 26 which opens through the top surface 12 as illustrated and the cladding or reinforcing plate when used is secured to the front side of the brick body and is provided with a keyhole slot, generally designated 28, which opens into the recess 26 and which is formed to receive the headed end of the supporting pin, hereinafter described.

The slot 28 in the construction illustrated in FIGURES 1 to 3 is of the form commonly known as a keyhole slot, having a circular upper end portion 30 which opens into a straight lower end portion 32. This keyhole slot is preferably located in the longitudinal center of the brick body.

The plate 22 has secured to the brick body opposing face thereof the pin reinforcing plate 34. This reinforcing plate, a detail of which is shown in FIGURE 4, is welded to the plate 22 and has at its bottom edge the narrow flange 36 which projects into the material of the brick, as shown in FIGURE 3.

The pin reinforcing plate 34 also has formed therein a pin receiving keyhole slot, generally designated 38, which is the same shape as the keyhole slot 28. Thus the two slots in the plates, 22 and 34 together form a keyhole slot for receiving the headed end of a suspension, or hanger pin P, fixed to, or embedded in its major portion in the brick to project from the opposite or rear face or side 20, as shown in FIGURE 3.

The pin is formed through the major portion of its length in a manner to ensure its maintenance of a firm connection with the body of the brick. The construction illustrated in FIGURE 3 and in certain of the following figures involves the formation of ribs or threads 40 in the pin shank. These threads or ribs terminate short of the head 42, thus leaving the unthreaded or unribbed narrow neck portion 44.

As shown, the pin is aligned with the lower or narrow end of the keyhole slot at the opposite or front side of the brick. Thus it will be understood that when the brick is to be joined to another brick of the same form or construction, the head 42 of the pin will be entered into the keyhole slot through the round or circular upper end part 30 until the head 42 of the pin reaches the recess 26, whereupon on the lowering of the brick the narrow neck portion 44 of the pin will move down in the straight narrow lower end 32 of the keyhole slot and the head of the pin will be firmly maintained against the inner side of the pin reinforcing plate 34 and the two bricks will be firmly joined or coupled together with the top, bottom and lateral faces flush.

Obviously the neck portion 44 of the pin will project to the proper extent to correspond to the combined thicknesses of the plates 22 and 34, and thus when the head 42 of the pin is in the recess 26 and lying across the lower part of the keyhole slot, the opposing faces of the two bricks will be maintained relatively tightly together.

In the molding or pressing of the brick, the flange 36 of the pin-fastener plate 34 and other plates hereinafter described where such plates may be flanged, will be pressed into the soft material of the brick. In this operation, the formation of the recess 26 for receiving the head of the pin, will be formed by the use of a suitable mold plug, or any other suitable means, attached to the inner surface of the pin-fastener plate.

FIGURES 5, 6, 7 and 8 illustrate other forms of pin reinforcing plates which may be employed. In these other forms it will be noted that the pin receiving slot opens through the top edge of the plate and accordingly the brick reinforcing plate will have its top edges slotted correspondingly, as illustrated in FIGURE 9. In all instances, with respect to the pin reinforcing plate, with exception of the plate shown in FIGURE 8, the pin receiving slot will be disposed on the longitudinal center of the brick and, of course, the pin will be on the longitudinal center of the brick on the opposite side from the reinforcing plate.

In FIGURE 5 the pin reinforcing plate is generally designated 45. This plate is shown with a narrow bottom flange 46 which is of a length less than the width of the plate and is located at the center of the same on the bottom edge.

The plate 45 is shown with a straight pin-neck receiving slot 47.

In FIGURE 6 the pin reinforcing plate is generally designated 48. This plate also is shown as having a bottom flange 50 and a slot 52 which is straight, or has parallel sides through the major portion of its length, like the slot 47 of FIGURE 5, but the plate at the upper end of the slot is cut away so that the edges of the slot flare outwardly, as indicated at 54. Thus, the slot is formed with a V-entrance which allows for the insertion of the pin of an adjacent brick to be accomplished with speed and ease.

FIGURE 7 shows a plate which corresponds to the plate 48 except that it is not provided with a flange 50. This plate in FIGURE 7 is generally designated 56, and has the pin receiving slot 58 with the outwardly flaring sides or edges 60 at its top end.

The plate 62 of FIGURE 8 is basically the same as the plates 48 and 56, with the exception that the vertical slot 64 is offset from the center line of the pin of the brick in which this plate is fixed. The lower end of the vertical slot 64 intersects a lateral or horizontal slot 66 and terminates in the semi-circular end 68, the center of which is located on the center line of the brick and of the pin which would be fixed in the opposite side of the brick.

In the use of the pin reinforcing plate having the lateral slot portion 66, as shown in FIGURE 8, it will be readily apparent that when another brick is to be attached to the brick carrying this plate 62, the brick being applied is first positioned in an offset location with respect to the brick to which it is being attached, so that the centrally located pin of the brick being applied may enter the slot 64 and when the pin reaches the bottom of this slot, then the brick is shifted laterally to bring the side edges, or lateral surfaces of the bricks into flush relationship and the attached brick cannot move up or down. They are, accordingly, in a semi-locked position or relationship.

FIGURE 9 illustrates, in perspective, a brick equipped with a pin reinforcing plate of the type shown in FIGURE 6 or 7, where the upper end of top end of the pin receiving slot is flared or V-shaped. The brick of this figure is generally designated 70, and while it may be of the construction illustrated in FIGURE 1, if desired, it is here shown as not only having the face reinforcing plate 72 corresponding to the plate 22, but it is shown as being encased or covered on its other three sides by a metal jacket or casing which is generally designated 74.

The brick 70 is also illustrated as being of the type having a stiffening or reinforcing channel member, generally designated 76 embedded therein with the web 78 of the channel secured to the inner face of the plate 72.

In this construction the pin reinforcing plate is fixed to the inner surface of the channel web 78. The pin reinforcing plate may be any one of five forms illustrated in FIGURES 4 to 8 inclusive, and in FIGURE 19, but for illustrative purposes the form shown in FIGURE 7 and generally designated 56 has been selected for FIGURES 1 to 18, and that in FIGURE 19, is shown in the bricks illustrated in FIGURES 20 to 24.

Using the form of pin reinforcing plate shown, the brick reinforcing face plate 72 will be provided at its top edge with the slot 80 flared at its top where it opens through the top edge of the plate 72 as indicated at 82. This slot 80–82 corresponds with the slot in the pin reinforcing plate and, of course, the two corresponding slots will open into the pinhead receiving recess 84 in the body of the plate. Also, as will be readily apparent, where the reinforcing channel member 76 is a part of the brick construction, the web portion 78 of the channel member would have to be slotted also to receive the neck of the pin.

In bricks constructed in accordance with the illustration of FIGURES 9 to 11, it will be seen that the pin which extends through a suitable opening in the metal casing 74 would have a neck portion 86 of considerably greater length than the neck portion 44 of the pin shown in FIGURE 3 to extend across the three thicknesses of metal so that the head 88 might enter the recess 84.

The slot in the web 78 of the channel 76 is designated 90.

FIGURES 12 to 14 illustrate another position location for a keyhole type slot, such as that shown in FIGURE 1. In these figures the brick is generally designated 92, having a face or front side reinforcing plate 94 with the other three sides jacketed as indicated at 96.

The keyhole slot in this construction is located on the longitudinal center of the brick and approximately at the transverse center or in the central transverse plane thereof, and is generally designated 98.

In FIGURE 14, the pin reinforcing plate is designated 34, corresponding with the plate shown in FIGURE 4. However, this plate may be flanged like the plate of FIGURE 4, or it may be devoid of the flange as desired.

The keyhole slot 38 of the pin reinforcing plate 34 opens into the pin head receiving recess 100.

FIGURE 14 illustrates another type of pin. This pin, generally designated P', is formed with a straight or a smooth shank, but has the inner end of the shank split and flared as indicated at 102, whereby the pin becomes locked or tightly bonded in the material of the brick.

Up to the present point the illustration and description of the invention have been directed to a brick showing a single socket and a single pin. However, the present invention contemplates the use of two or more such pins and sockets per brick where such a construction may be found desirable, and in this connection FIGURE 15 illustrates a brick construction embodying two sockets and two pins. In this figure the illustrated brick is shown having at the top or in the top part thereof the pin reinforcing plate of the type shown in FIGURE 8.

This brick is generally designated 104 and is illustrated with the external face plate 106, on the front side thereof and a jacket encasing the three remaining sides as indicated at 108, such jacket being similar to the jacket 74 hereinbefore described.

The brick 104 is also shown as having the reinforcing channel member 110. It is to be understood, however, that in the use of the pin reinforcing plate 62, as illustrated in FIGURE 15, the metal jacket 108 and the reinforcing channel member 110, may be employed or omitted from the brick construction as desired. Accordingly in illustrating a channel in this brick and in other figures, and in illustrating the jacket 108 and plate 22 in this and other figures, it is to be understood that the invention is not to be considered as limited to the employment of these parts in the brick. In other words, the brick in each instance may be constructed without the channel, jacket and face plate or may have only one or the other as preferred.

In the use of the angulated slot with which the plate 62 is provided, it will, of course, be obvious that the reinforcing plate 106 must also have a slot of the same configuration and this slot is generally designated 112. Also it will be obvious that if the reinforcing channel 110 is employed with the pin reinforcing plate 62, the web portion of this channel will also have a slot of the same configuration therein as indicated at 114 in FIGURE 15.

The pin head receiving recess in the material of the brick 104 is generally designated 116, and the pin having the corrugated shank would, of course, have the proper length neck portion 118 to span the three thicknesses of metal in order to position the head 120 in the recess 116 of a correspondingly formed or constructed brick. As previously stated the pin in a brick having the angulated slot in the pin reinforcing plate and in the face plate, would be located in the longitudinal center of the brick, so that when the pin head is entered in a slot of a corresponding brick having the angulated pin reinforcing plate, the pin will be shifted laterally in the slot to bring the lateral faces of the coupled bricks into the same plane or flush with one another.

In the two-slot-two-pin construction of FIGURE 15 the bottom end or lower part of the brick has on the same side or face as the slot 112, the pin reinforcing plate 56, such as is illustrated in FIGURE 7 or it may be flanged like the reinforcing plate shown in FIGURE 6. This plate is positioned with the slot in the longitudinal center of the brick or in the longitudinal central plane, with the open end of the slot directed downwardly through the bottom of the brick as illustrated particularly in FIGURE 16.

The bottom edge of the reinforcing plate 56 is flush with the bottom edges of the plate 106 and the web portion of the reinforcing channel 110 and the plate 56 is secured against the inner face of the channel web as shown particularly in FIGURE 17.

The plate 106 and the web of the channel 110 are each provided with a slot corresponding to and aligned with the slot 58, the slots of the plate and channel web being designated respectively 124 and 126.

The numeral 128 designates the recess in the material of the brick 104 for receiving the head of a suspension pin 130. This pin is located adjacent to the bottom of the brick in the longitudinal center thereof and on the rear side, whereby it may be readily engaged in a slot at the bottom of another brick of the same construction.

From the description thus far given of the invention it will be seen that any number of bricks may be readily coupled together by engaging the pin, or pins, of one brick in the pin receiving slot, or slots, of another brick. Accordingly, the bricks, in whatever number required when hooked together or interlocked in this manner, will form a strong unitary structure.

In addition to providing a brick with pins and sockets in the longitudinal, center front to rear plane in accordance with the illustration of FIGURE 15, a brick may be provided, for added strength, with side by side sets of pins and sockets near to the top edge or surface thereof, that is, there may be provided two or more sockets on the forward face of the brick in a line transversely of the face and the same number of pins on the rear side of the brick.

In the form of the invention where the pin receiving slots are positioned with the closed end of the slot towards the bottom of the brick it will be seen that the pin of one brick will be moved downwardly in the slot of an adjacent and supporting brick so that the said one brick will hang from the supporting brick.

In the form of the invention illustrated in FIGURE 15 the brick when joined to another brick of the same construction will be held by pins in the top and bottom end slots so that in the assembly with the edges of the bricks flush one with the other the bricks cannot move up or down or laterally at the lower or bottom ends. In applying one brick of the construction shown in FIGURE 15, to another the slots 58, 124 and 126 will be of sufficient length whereby the bottom pin 130 of a cooperating brick may be introduced into the slots and the brick which is being attached to the cooperating brick lowered sufficiently to bring the pin 120 at the top of the cooperating brick into position for introduction into the recess 116 and the slots of the adjacent elements. Then by shifting the applied brick upwardly and laterally the upper pin 120 may be placed in the short lateral extension of the reinforcing plate. The lower pin of the cooperating brick will then be located in the lower slots of the applied brick somewhere below the closed upper ends of the slots.

Referring now to FIGURE 19 there is here illustrated another form or design of reinforcing plate or socket flange, which is generally designated 150.

As illustrated in FIGURES 20 to 25 this socket flange may be embodied in a brick structure alone or without other coacting elements or it may be associated in the brick structure with the facing or cladding plate or with a reinforcing channel as preferred.

The socket flange 150 is substantially U-shaped in form. Thus, it has the web portion 152 flanked by the spaced parallel wing portions 154 which project from the side of the web portion, which might be identified as the rear side and when the flange is in place in the brick body the wing portions project into or are embedded in the material of the brick.

Each of the wing portions 154 has a part of the top edge and of the bottom edge cut and bent inwardly to form the anchoring fingers 156. The lower edge or bottom part of the web portion is extended downwardly and shaped to provide a transversely rounded tongue 156', the curve or bow projecting rearwardly, with respect to the web portion, while the lower edge 158 of this tongue is approximately in the plane of the forward face of the web portion.

FIGURES 20 and 21, which illustrate the upper or top end portion of a brick, show the application of the socket flange 150.

The web portion 152 of the socket flange is illustrated as having a straight vertical slot 160 therein, which opens through the top edge of the web as shown.

When the socket flange is joined to a brick body such as the body generally designated 162, it is embedded in the material of the brick with the forward face of the web portion 152 in the plane of the forward side or face 164 of the brick as illustrated. The wing portions 154 are embedded in the material of the brick and the top edge of the web portion 152 and the edges of the wing portions together with the edges of the upper anchor fingers 156, are flush with the top surface 166 of the brick body.

As in the previously described structures, the material of the brick body is formed with a recess 168, over the forward side of which the web portion 152 lies and the recess opens through the top surface 166 of the brick. This provides for the introduction of the head and neck portion of a pin of an associated brick, such as the pin illustrated in FIGURE 21, where the head and neck portion is designated 170.

The curved tongue 156', which extends downwardly from the web portion of the socket flange has the concave forward surface open at the front side of the brick and the edge 158 which lies in the plane of the brick surface 164 will bear against the rear side of another brick of like construction.

FIGURES 22 and 23 illustrate the use of the socket flange 150 in a brick in association with a reinforcing channel body. In these figures the brick body is generally designated 172.

The numeral 173 designates a reinforcing channel body embedded in the brick body in the usual manner. The web of the channel is designated 174, while the side parts or flanges are designated 175. As shown the web has its outer face in the plane of the front face or forward side 176 of the brick body and the web at its top is formed with the slot 178.

The socket flange 150 is positioned with its forward face, that is, the outer face of the web portion 152, against the inner side of the channel web 174 as illustrated, and the slot 160 of the socket flange web 152 is aligned with slot 178 of the channel web.

The numeral 180 designates the recess in the material of the brick body for receiving a pin head, while the numeral 182 designates the projecting portion of the pin which is fixed in the brick body and extends from the rear side or face thereof.

FIGURES 24 and 25 illustrate the application of the socket flange to a brick in association with a reinforcing channel and a face plate. In these figures the face plate is designated 184 and is fixed to the forward side or face of the brick, the body of which is generally designated 186.

The plate 184 has formed therein the longitudinal slot 188 which opens through the top edge of the plate and conforms in size and length with the slot 178 in the web of the channel 173 and with the slot 160 in the web portion of the socket flange.

The numeral 190 designates the pin head receiving recess in the body of the brick.

In these FIGURES 22 to 25, the same reference numerals have been employed for designating the channel and socket flange since these parts are the same in each case.

It will be understood from the foregoing description that the tongue 156' of the socket flange functions as a stiffening rib and in the cases where the socket flange is associated with a reinforcing channel or with the face plate, this reinforcing tongue or rib will bear at its free edge against the inner side of the channel web.

In connection with the building of the entire roof structure, the methods at present employed involve either the construction of complicated and costly steel members which are attached to the furnace superstructure well in advance of the beginning of the roof structure proper or a wooden form may be constructed within the furnace area which includes in its construction wooden or tubular metal arch trusses which are placed on approximately 16" to 18" centers with cross bracing to secure the trusses in upright position and a great deal of additional wood or metal structure in the form of beams is employed to provide the form on which the roof is constructed. After the roof has been built, all of the materials used in forming the arch contour must be removed before the furnace can be put into use.

With the present invention using the pin-socket bricks, the only preliminary work required would be the adjusting of the jacks of the hold-down I beams to conform to the desired inch rise per foot of the roof span. In most open hearth furnaces in use today, the jacks and I beams are already in use for sprung arch construction so that there will be no additional expense for these costly structural units.

If the personnel responsible for the construction of sprung arch roofs on industrial furnaces should wish to change the inches rise per foot of span in order to experiment and attain the optimum roof constructoin for their individual furnace, and if either of the present day construction methods were used, then great expense would be required for such experimentation. On the other hand, by using the pin-socket brick structure of the present invention, any rise could be obtained with a minimum of expense, by selecting the proper tapered brick with the pin-socket device. The only expense involved would again be the adjustment of the jacks to prelocate the I beams.

FIGURE 26 shows a slightly modified form of the socket flange illustrated in detail in FIGURE 19 and shown incorporated in the bodies of the bricks in FIGURES 20 to 25. In this modified socket flange structure it will be seen that the wing portions, designated 154', have the anchoring fingers, designated 156" bent from a vertical position, as opposed to being bent from a horizontal position, as the corresponding fingers or lugs 156 are shown. In other words, in order to form the fingers 156" the wing portions or side flanges have vertical slits formed therein from the top and bottom edges and parallel with the rear vertical edges of the flanges and the fingers or lugs thus produced by making these vertical slits are then in a vertical plane to extend inwardly as illustrated. Thus the fingers or lugs 156" will be spaced from the adjacent top and bottom edges of the wing portions or side flanges rather than directly at the top and bottom edges of the wings and they will also be removed farther from the front or web portion 152' and thus will be buried deeper in the material of the brick.

From the foregoing it will be seen that there is provided by the present invention a new brick structure in which are embodied novel elements whereby the brick may be easily and quickly joined in locking connection with another brick of the same construction or whereby any desired number of such bricks may be lockingly coupled together for patching a furnace roof or for building a complete roof of the sprung arch type or for building a flat roof, by the use, in the first case, of tapered or wedge shaped bricks or, in the second case, by the use of bricks having parallel front and rear faces.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore, intended to be embraced by those claims.

I claim:

1. An interlocking refractory brick comprising a brick body of refractory material having at least two functional sides for interlocking connection with corresponding sides of another brick, an external plate overlying and secured to one of said sides, a pin reinforcing plate secured to said first plate between the latter and the body of the brick, the brick body having a recess therein covered by said plates, said plates having coinciding matching slots therein leading into said recess and having closed inner ends, and a coupling pin secured to the body of the brick and having a headed end projecting beyond the said other one of said sides, said headed end of said pin being adapted to be introdcued in the recess in a brick of like construction and to have a portion of the pin between the head and the brick body introduced into said coinciding slots to the closed end thereof with said head spanning the slots on the inner side of the pin reinforcing plate.

2. The invention according to claim 1, wherein said matching slots are in the form of keyhole slots having a circular outer end portion of a size to permit passage of the head of a coupling pin and having a straight inner end portion of a width to receive the said portion of the pin between the head and the brick body but of less width than the head.

3. The invention according to claim 1, wherein said matching slots open at one end through the edge of the plates at an end face of the brick and have closed inner ends and said recess opens through said end face of the brick.

4. The invention according to claim 3, wherein said matching slots have substantial length and lie in the longitudinal center of the said one side of the brick and wherein said pin head lies in the longtitudinal center of the said other one of said sides of the brick.

5. A refractory brick for interlocking connection with another brick of like construction, said brick comprising a body of refractory material having at least two functional sides, a reinforcing channel having leg portions embedded in the refractory material and a web portion lying at and substantially paralleling one of said sides, a pin reinforcing plate secured to said web portion between the latter and the body of the brick, the brick having a recess therein covered by said web and plate, said web and reinforcing plate having matching slots therein leading into said recess, and a coupling pin secured in the body of the brick and having a headed end projecting beyond the said other one of said sides of the brick body and positioned and adapted to have a portion lying between the head and the brick body introduced into said coinciding slots and recess with said head spanning the slots on the inner side of the pin reinforcing plate.

6. The invention according to claim 5, wherein said brick body has a top end and said web and plate have top edges lying substantially flush with said top end of the brick body and wherein said slots open through said edges of the web and plate and said recess opens through the said top end of the brick body.

7. A refractory brick for interlocking connection with another brick of like construction, said brick comprising a body of refractory material having a top end and a bottom end and at least two functional sides, a pin reinforcing plate of substantially U-form having a web portion and opposite side wing portions, said wing portions being embedded in the body of the brick and said web portion having a front side substantially flush with one of said sides of the brick body, said web portion having a top edge adjacent to the said top end of the brick body, said web portion having a slot therein and opening through the said top edge of the web, a reinforcing tongue portion projecting down from the bottom part of said web and transversely bowed away from the adjacent side of the brick body and embedded in the material of the brick body, said brick body having a recess in said one of said sides and aligned with said slot and having the slot opening thereinto, said recess opening through the said top end of the brick body and being of greater width than the said slot, and a pin fixed in said body and extending from the other one of said two functional sides substantially perpendicular to said functional sides and aligned with the lower end of said slot and having an end with a head spaced from said other one of said functional sides, the head being of greater width than said slot and adapted to enter the recess of a brick of like construction, the portion of the pin between said head and the adjacent side of the brick being of a cross-sectional dimension to engage in the adjacent slot.

8. An interlocking refractory brick comprising a brick body of refractory material having at least two functional sides for interlocking connection with corresponding sides of another brick, a pin reinforcing plate embedded in the surface of said body on one of said sides and having a width less than the width of the said side and having one surface flush with the surface of the said side of the body, said reinforcing plate including a portion extending from an edge thereof into the material of the brick to lock the plate to the brick, said portion extending from an edge of the plate comprising a transversely bowed tongue, the convex side of which is directed away from the said one surface of the plate, said plate having a slot therein opening through an edge thereof, a headed pin coupling element secured to the brick body by a portion embedded in the brick body and projecting from the other one of said sides and spaced therefrom by a reduced portion, said slot having a width less than the width of said head but slightly greater than the width of said reduced portion, and means in the refractory material forming an entrance for the head of a headed coupling pin of another brick of like construction for facilitating the engagement of the reduced portion of the coupling pin in the slot with the head of the pin in the said means between the brick and the plate, said entrance forming means comprising a recess in and opening through a surface of the brick body and into which recess the said slot opens.

9. An interlocking refractory brick comprising a brick body of refractory material having a bottom surface and a top surface and at least two functional sides for interlocking connection with corresponding sides of another brick, a pin reinforcing plate embedded in the surface of said body on one of said sides and having a width less than the width of the said side of the body, said plate having opposite side wing portions projecting therefrom into the body of the brick, said reinforcing plate including a portion extending from an edge thereof into the material of the brick to lock the plate to the brick, said portion extending from an edge of the plate comprising a transversely bowed tongue and the said edge of the plate being the bottom edge thereof, said plate having a slot therein, said plate having a top edge through which said slot opens, a headed pin coupling element secured to the brick body by a portion embedded in the brick body and projecting from the other one of said sides and spaced therefrom by a reduced portion, said slot having a width less than the width of said head but slightly greater than the width of said reduced portion, and means in the refractory material forming an entrance for the head of a headed coupling pin of another brick of like construction for facilitating the engagement of the reduced portion of the coupling pin in the slot with the head of the pin in the said means between the brick and the plate, said entrance forming means comprising a recess in the brick body and opening through the said top surface thereof and into which recess the said slot opens.

10. The invention according to claim 9, wherein each of said side wing portions carries at least one anchoring finger spaced from said plate and extending from the carrying wing portion toward the other wing portion.

11. The invention according to claim 9, wherein each of said side wing portions has a part thereof bent to extend at right angles thereto toward the other wing portion and forming an anchoring finger.

12. The invention according to claim 9, wherein each of said side wing portions has at least two integral parts thereof bent to extend toward the other wing portion and being spaced from the plate and the said two parts of each wing portion forming a pair of anchoring fingers spaced from one another in the vertical direction of the plate.

13. The invention according to claim 12, wherein said pairs of fingers have upper and lower surfaces of substantial width as compared to the thickness thereof.

14. A refractory brick for interlocking connection with another brick of like construction, said brick comprising a body of refractory material having two functional sides and two lateral sides, a reinforcing channel having leg portions embedded in the refractory material inwardly of said lateral sides and a web portion lying at and substantially paralleling one of said functional sides, a pin reinforcing plate secured to said web portion between the latter and the body of the brick, said reinforcing plate including a portion extending from an edge thereof into the material of the brick and having locking connection with the brick, the brick having a recess therein covered by said web portion and reinforcing plate, said web portion and reinforcing plate having matching slots therein leading into said recess, and a coupling pin secured in the body of the brick and having a headed end projecting beyond the other one of said functional sides of the brick body and positioned relative to said slots and recess and adapted to have a portion lying between the head and the brick body introduced into said matching slots and recess with said head spanning the slots on the inner side of the pin reinforcing plate.

15. The invention according to claim 14, wherein said portion of the reinforcing plate extending from an edge thereof comprises an elongate transversely bowed tongue having the convex side thereof directed away from the said one surface of the reinforcing plate and having a longitudinal edge in opposed relation to the said web portion of said channel.

16. The invention according to claim 14, wherein the said pin reinforcing plate has spaced opposite side wing portions projecting therefrom into the body of the brick and directed away from the web portion of said channel, and each of said wing portions carries at least one anchoring finger extending therefrom toward the other wing portion.

17. The invention according to claim 16, wherein a pair of vertically spaced anchoring fingers are carried by each of said wing portions, each of said fingers forming an elongate section of the material of the carrying wing portion partially separated from the wing portion and bent to extend toward the opposite wing portion.

18. The invention according to claim 17, wherein said anchoring fingers have a substantial width as compared to the thickness thereof and the wider sides of each pair being in opposed relation.

References Cited by the Examiner

UNITED STATES PATENTS

| | | | |
|---|---|---|---|
| 595,988 | 12/97 | Brock | 50—443 |
| 790,514 | 5/05 | Meara et al. | 50—443 |
| 1,452,583 | 4/23 | Williams | 110—99 X |
| 1,912,920 | 6/33 | Saunders | 50—396 |
| 2,017,911 | 10/35 | Manske et al. | 50—396 |
| 2,142,305 | 1/39 | Davis | 50—437 |
| 2,885,976 | 5/59 | McGill et al. | 110—99 |
| 3,005,424 | 10/61 | Heuer | 110—99 |
| 3,013,510 | 12/61 | Parker et al. | 110—99 |
| 3,085,523 | 4/63 | Lelak | 110—99 |

OTHER REFERENCES

German Printed Application No. 1,114,971, printed Oct. 12, 1901.

FREDERICK L. MATTESON, JR., *Primary Examiner.*

JAMES W. WESTHAVER, *Examiner.*